United States Patent [19]
Weber

[11] Patent Number: 6,129,312
[45] Date of Patent: Oct. 10, 2000

[54] AIRCRAFT DECOMPRESSION VENT ASSEMBLY

[75] Inventor: Joseph G. Weber, Everett, Wash.

[73] Assignee: The Boeing Company, Seattle, Wash.

[21] Appl. No.: 09/160,629

[22] Filed: Sep. 24, 1998

Related U.S. Application Data

[60] Provisional application No. 60/060,109, Sep. 26, 1997.

[51] Int. Cl.⁷ .................................................. B64D 25/00
[52] U.S. Cl. .................................... 244/118.5; 244/129.2; 244/129.4; 52/1; 52/98
[58] Field of Search ............................ 244/118.5, 129.4, 244/129.2; 52/1, 98

[56] References Cited

U.S. PATENT DOCUMENTS

| | | | |
|---|---|---|---|
| Re. 32,554 | 12/1987 | Murphy ................................. | 244/118.5 |
| 3,571,977 | 3/1971 | Abeel ..................................... | 244/129.5 |
| 3,854,567 | 12/1974 | Poupin et al. ............................ | 198/20 |
| 4,390,152 | 6/1983 | Jorgensen ................................. | 244/118 |
| 4,432,514 | 2/1984 | Brandon ................................... | 244/118 |
| 4,498,261 | 2/1985 | Wilson et al. ............................... | 52/1 |
| 4,899,960 | 2/1990 | Hararay-Tehrani et al. ......... | 244/129.4 |
| 5,048,239 | 9/1991 | Filitz et al. .................................... | 52/1 |
| 5,069,401 | 12/1991 | Shephard et al. ..................... | 244/118.5 |
| 5,118,053 | 6/1992 | Singh et al. ......................... | 244/118.5 |
| 5,137,231 | 8/1992 | Boss ..................................... | 244/118.5 |
| 6,029,933 | 2/2000 | Holman et al. ....................... | 244/118.5 |

*Primary Examiner*—J. Woodrow Eldred
*Attorney, Agent, or Firm*—Ann K. Galbraith

[57] ABSTRACT

An air return grille for an aircraft mounted below the passenger cabin sidewall comprises openings to allow return airflow from the air conditioning system. In a preferred embodiment, the grille openings are covered by a single thin baffle 32 with cutouts within its periphery that slip over and are held in place by fasteners on the molded grille 28. The thin baffle 32 is affixed to the molded grille 28 along one or more edges on the grille. All other thin baffle 32 attachments allow for the baffle to be disengaged upon the onset of a rapid decompression. During normal operation, the thin baffle 32 restricts flow through a small opening in the grille. During a sudden/rapid decompression of the cargo compartment/lower lobe, the baffle is dislodged from the fasteners and forced into a position parallel to the airstream. This allows the airflow to pass through all of the molded grille 28 openings in order to achieve rapid pressure equalization.

7 Claims, 8 Drawing Sheets

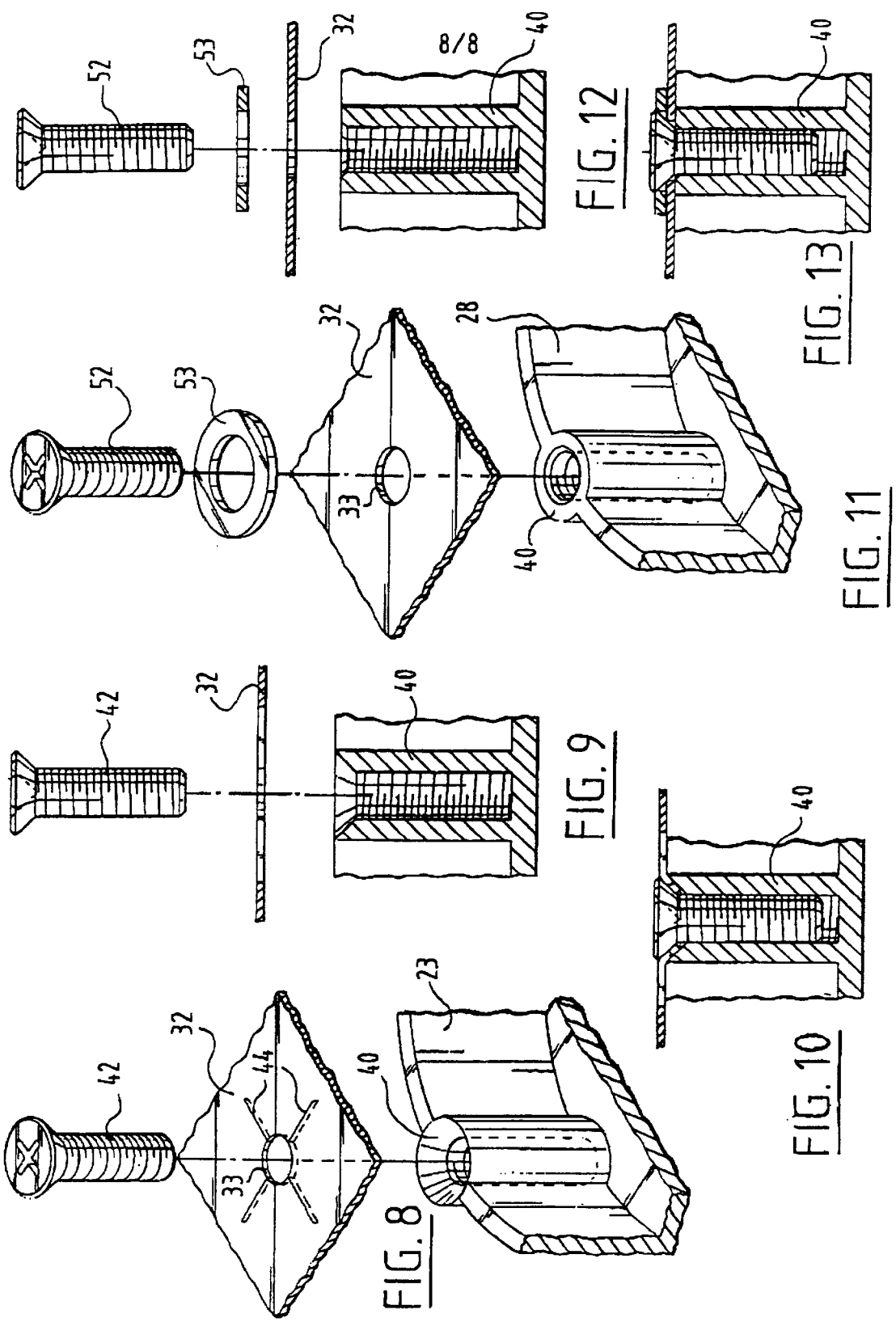

AIRCRAFT DECOMPRESSION VENT ASSEMBLY

This application claims benefit of provisional application Ser. No. 60/060,109 filed Sep. 26, 1997.

TECHNICAL FIELD OF THE INVENTION

This invention relates to vent systems used for controlling return airflow and rapid decompression airflow within the fuselage of commercial aircraft, particularly those commercial aircraft known as "wide bodies."

BACKGROUND OF THE INVENTION

As is well known in the aircraft industry, rapid decompression in an aircraft can have disastrous consequences. Such decompression can result from leaving a cargo door ajar, failing to lock the door properly, or if a rupture of the aircraft skin occurs for any reason. Also, during normal operations there is a need to provide a return air path within the environmental control system for conditioned air to be circulated within the aircraft cabin and cargo areas.

Accordingly, a large number of air grilles are provided in an aircraft to serve a dual purpose, i.e., delivery of fresh air, and, in an emergency, to allow for the rapid movement of very large quantities of air during decompression. Such air grilles also are desired to reduce noise in the aircraft by blocking airflow noise from coming through the grilles during normal operations. See, for example, the U.S. Pat. No. 5,137,231 by Boss, that is assigned to the assignee of this invention.

The original design requirements for this vent design include the need for a large effective opening (approximately 100 in$^2$ for lower lobe decompression. In addition, a small effective opening (approximately 10 in$^2$ must be provided for main cabin decompression. The vent must provide this effective opening within fractions of a second (approximately 40 msec) at a very low pressure differential (approximately 15 psig) upon the onset of a rapid decompression. The small effective opening is also required for the normal air return flow from main cabin to lower lobe. The small opening creates a pressure drop that yields a direct air return flow through the vent assembly.

Problems with most prior art air grilles are in their noise production complexity, weight, cost, cleaning, and maintenance. See also, U.S. Pat. No. 3,854,567 by Roach, U.S. Pat. No. 4,432,514 by Brandon, and U.S. Pat. No. Re. 32,554 by Murphy, each of which discloses a decompression panel having actuatable openings and spring valve means for relieving a pressure differential between an aircraft cabin and the cargo compartment.

This invention pertains to a vent assembly for use in aircraft and solves the problem of having to use heavy, mechanically complex and expensive vents for controlling return airflow and rapid decompression airflow within the fuselage of commercial aircraft. Prior attempts in solving the regulation of return airflow and rapid decompression airflow have resulted in the creation of heavy and expensive assemblies made of many diverse parts. Previous designs have relied on complex mechanical features, such as pivoting louvers hinged doors/gates, and multiple baffles, for controlling the airflow. These prior vents are very costly because of the high recurring cost associated with assembling them. These assemblies have also required extensive adjustments in order to achieve the desired airflows.

SUMMARY OF THE INVENTION

The above noted problems associated with complex and heavy assemblies are solved by the combination of a thin and flat material baffle with slits placed over retention features such as tabs on an injection molded grille. The result is a vent assembly that is light in weight, easy to maintain, and very reliable because of its simplicity and low part count.

BRIEF DESCRIPTION OF THE DRAWINGS

The present invention will be described more fully in the following detailed description in conjunction with the attached drawings, in which:

FIG. 8 is an expanded isometric view of a releasable retention means for attachment of a thin baffle to a molded grille.

FIG. 9 is an expanded cross-sectional view of a threaded boss and screw for attachment of the thin baffle to a molded grille.

FIG. 10 shows a cross-sectional view with a screw installed to attach a think baffle to a molded grill.

FIG. 11 is an expanded view similar to that of FIG. 8 except that there are no perpendicular cut lines on the thin baffle.

FIG. 12 is an expanded cross-sectional view similar to FIG. 12 except there is a washer shown in position to secure a thin baffle to a grille.

FIG. 13 shows a cross-sectional view similar to FIG. 10 except that a washer is included in FIG. 13.

DESCRIPTION OF A PREFERRED EMBODIMENT

Figure 1:
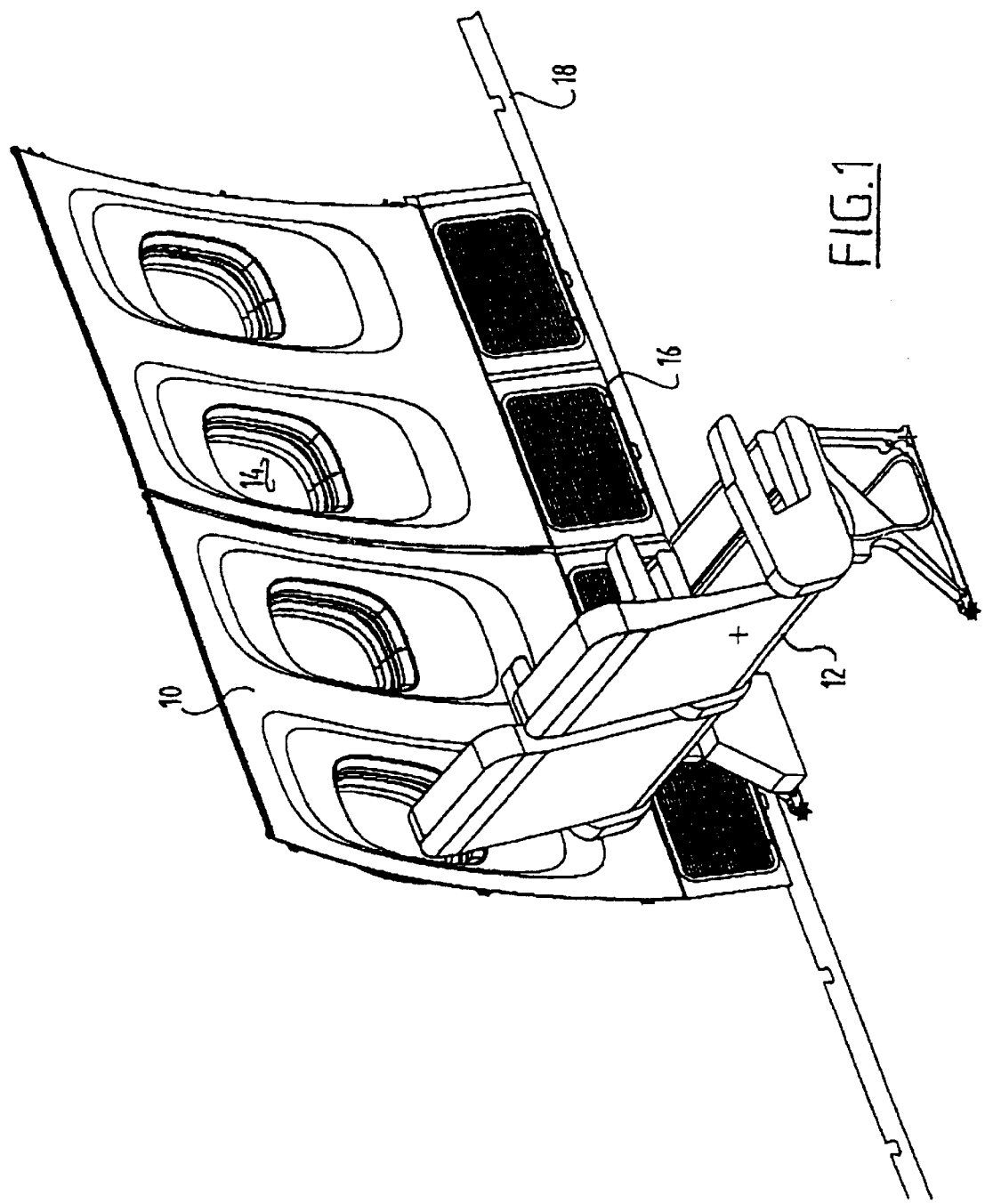
FIG. 1 is a cutaway side elevation of the passenger cabin of a commercial aircraft with four decompression vents in place beneath the windows.

FIG. 1 shows an aircraft sidewall 10 and four of the decompression vents 16 of this invention as they are installed in an aircraft passenger cabin. Seats 12, windows 14, decompression vents 16, and a floor support angle 18 are attached to the floor beams. The two forward seats have been removed to aid visibility behind the forward seats.

Figure 2:
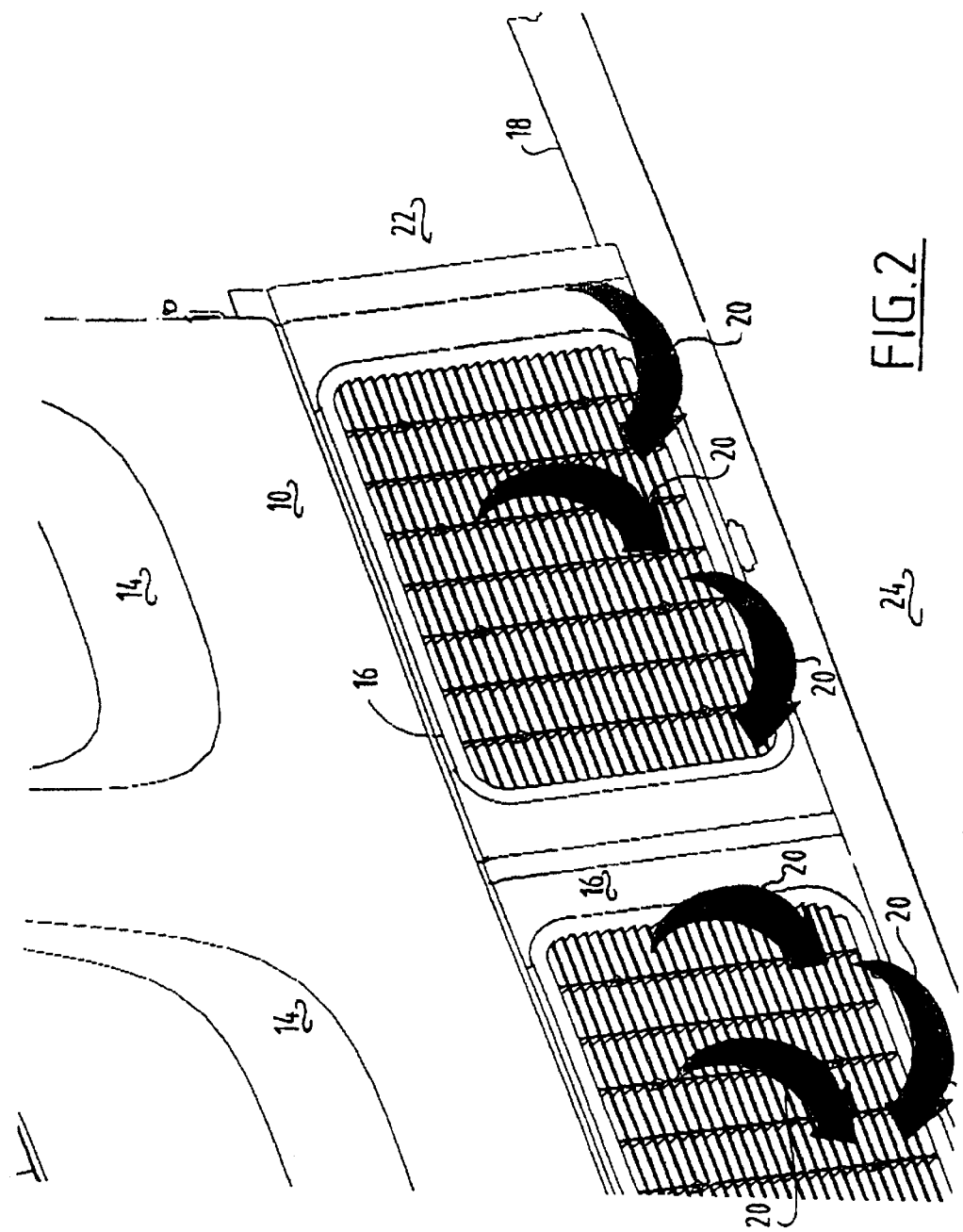
FIG. 2 is a more detailed showing of two decompression vents and the normal return air flow from the passenger cabin to the cargo compartment.

FIG. 2 shows normal, non-decompression, low velocity airflow 20 moving from the passenger cabin 22 enroute to the cargo compartment 24 below. In this "normal" mode of operation, the decompression vents serve to circulate passenger return airflow, utilizing only several of the lower louvers of molded grille 28. As will be seen in the Figures to follow, the upper louvers are blocked by the thin baffle in this "normal" mode of operation.

Figure 3:
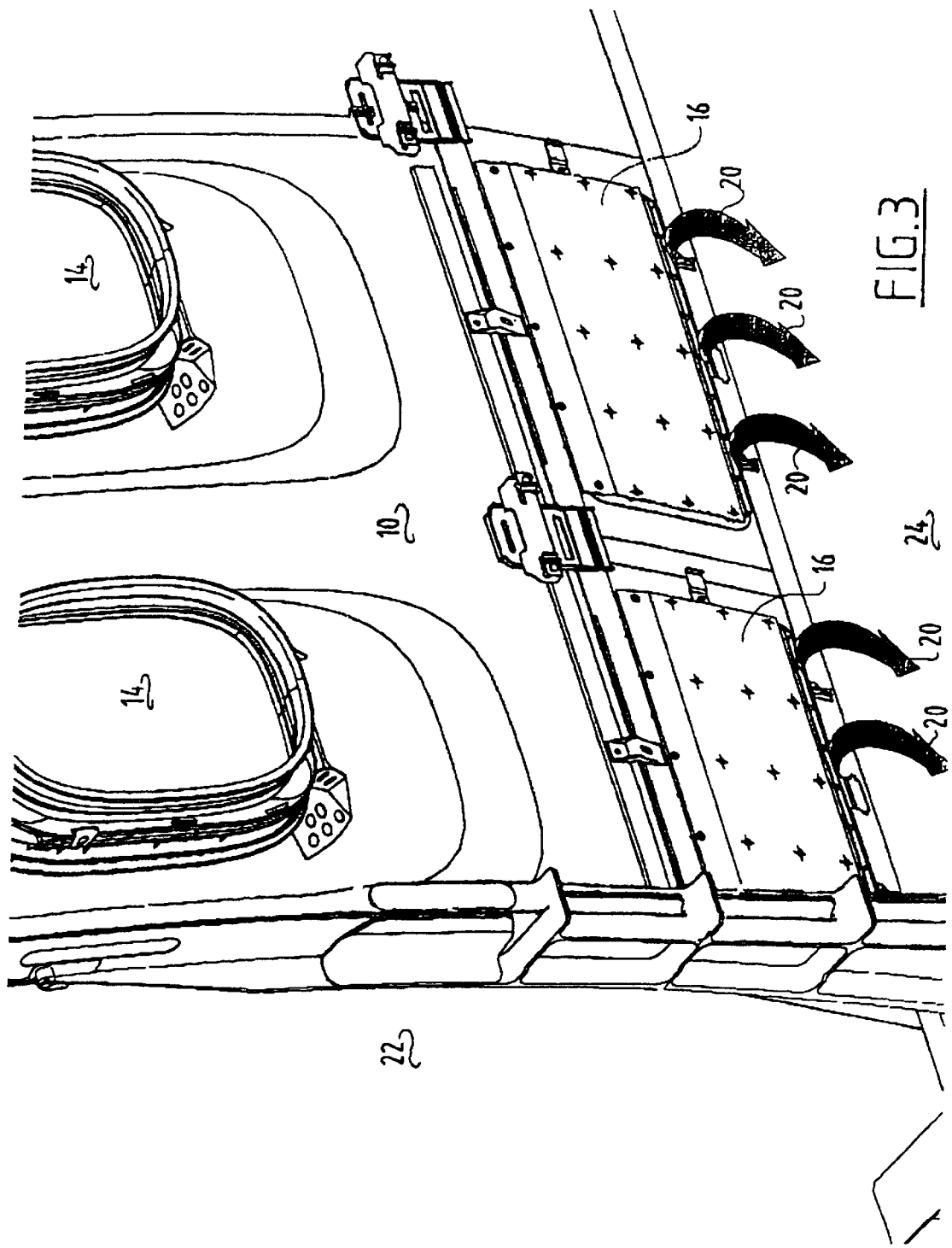
FIG. 3 is a cutaway side elevation view of the cabin sidewall showing two decompression vents with normal return airflow taking place.

Twenty bosses 40 are installed on each molded grille 28 and serve to connect the molded grille 28 to the thin baffle 32 as will be shown on further Figures. FIG. 3 is an isometric drawing showing the back side of the decompression vent 16.

Figure 4:
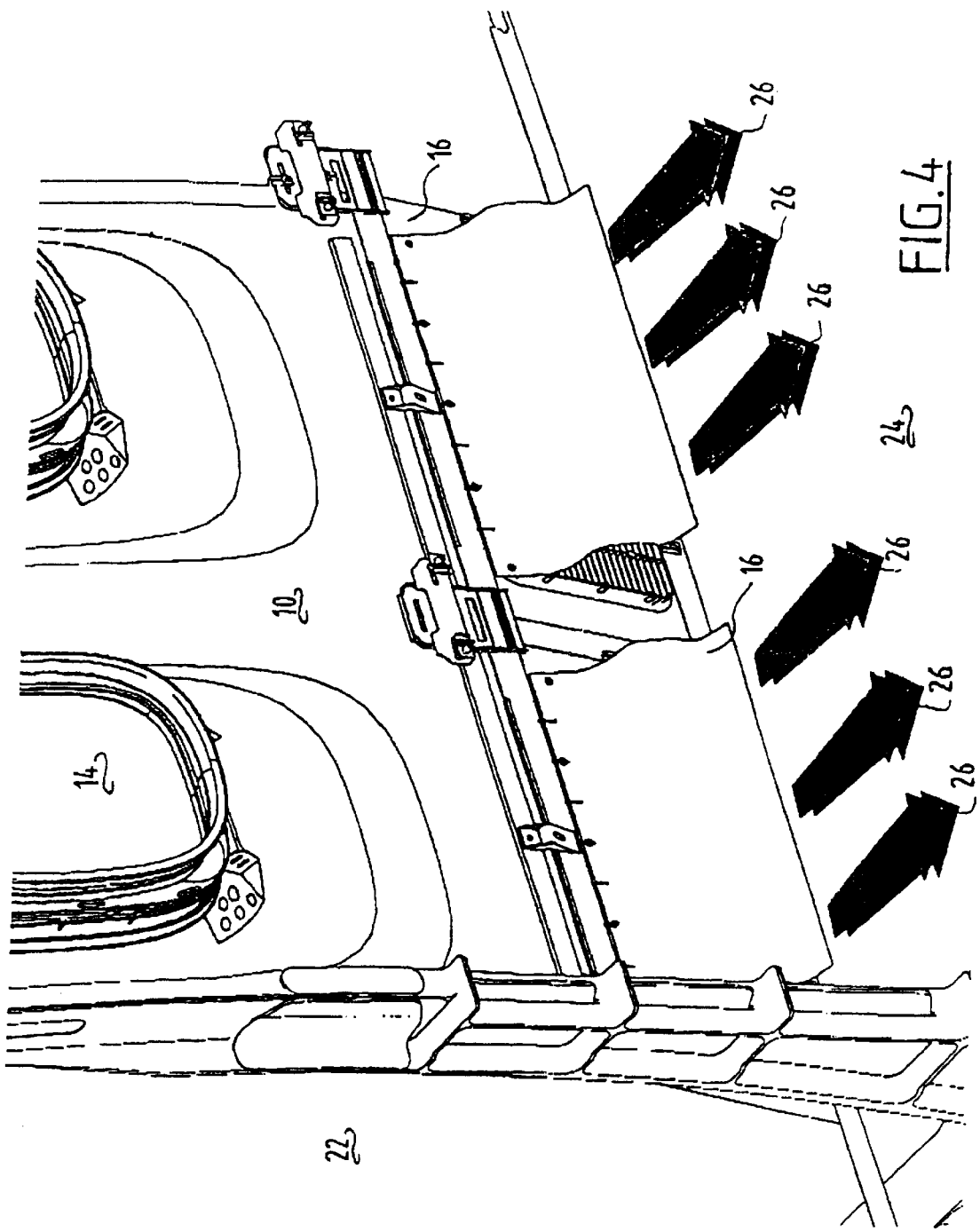
FIG. 4 is a cutaway side elevation view showing rapid decompression in its initial stages.

FIG. 4 is an isometric drawing showing the backside of a decompression vent 16 during rapid decompression as shown by the airflow direction indicators 26. As will subsequently be more apparent, the thin baffle 32 is no longer attached to the molded grille 28 except at the upper row of bosses 40 and retention fasteners.

Figure 5:
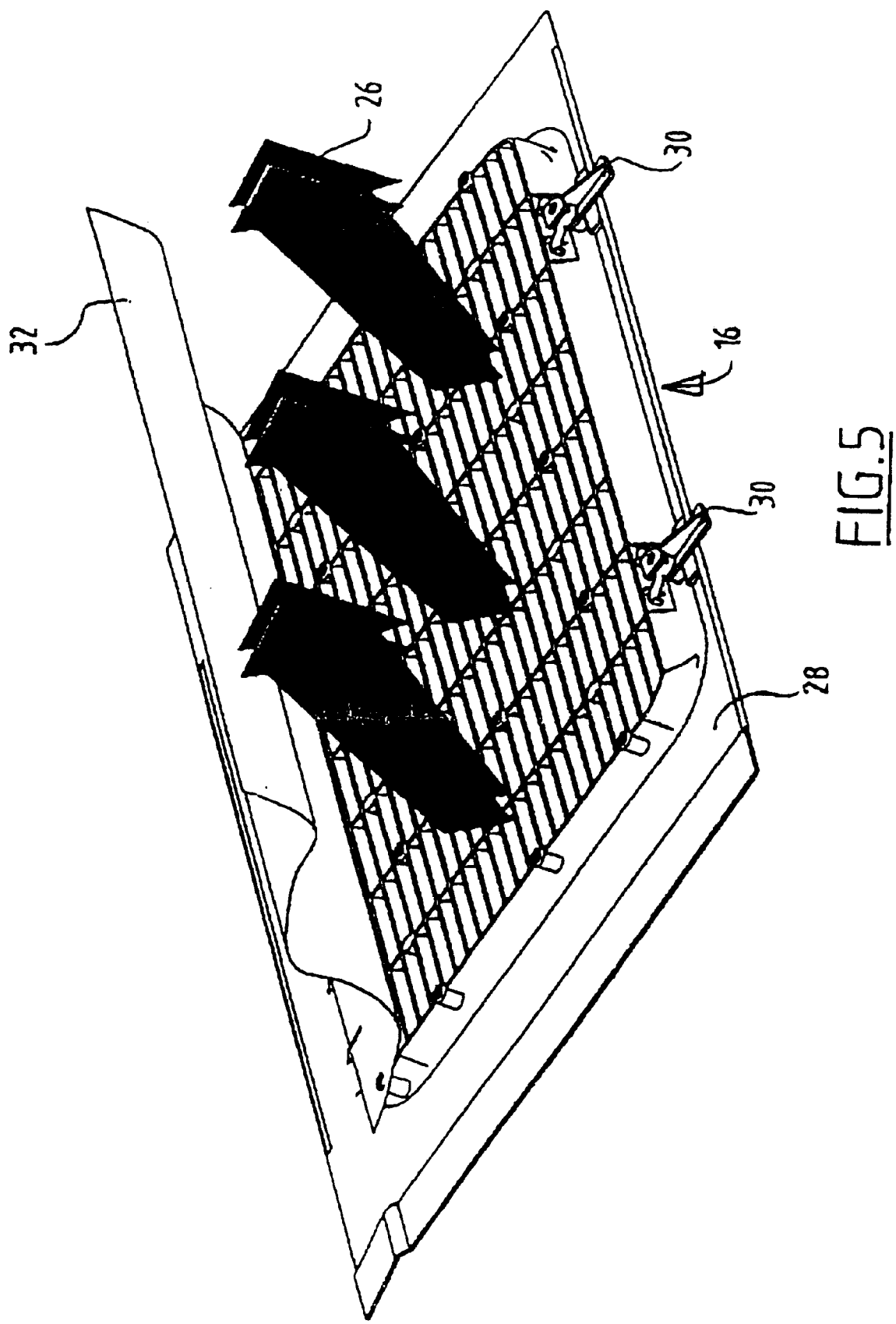
FIG. 5 is an isolated isometric view of a decompression vent in initial stages of decompression.

FIG. 5 shows details of the molded grille 28 which is held in place by multiple latches 30 while the thin baffle 32 is shown to be partly disconnected from the molded grille 28 to allow unrestricted airflow during rapid decompression from the passenger cabin to the cargo compartment.

Figure 6:
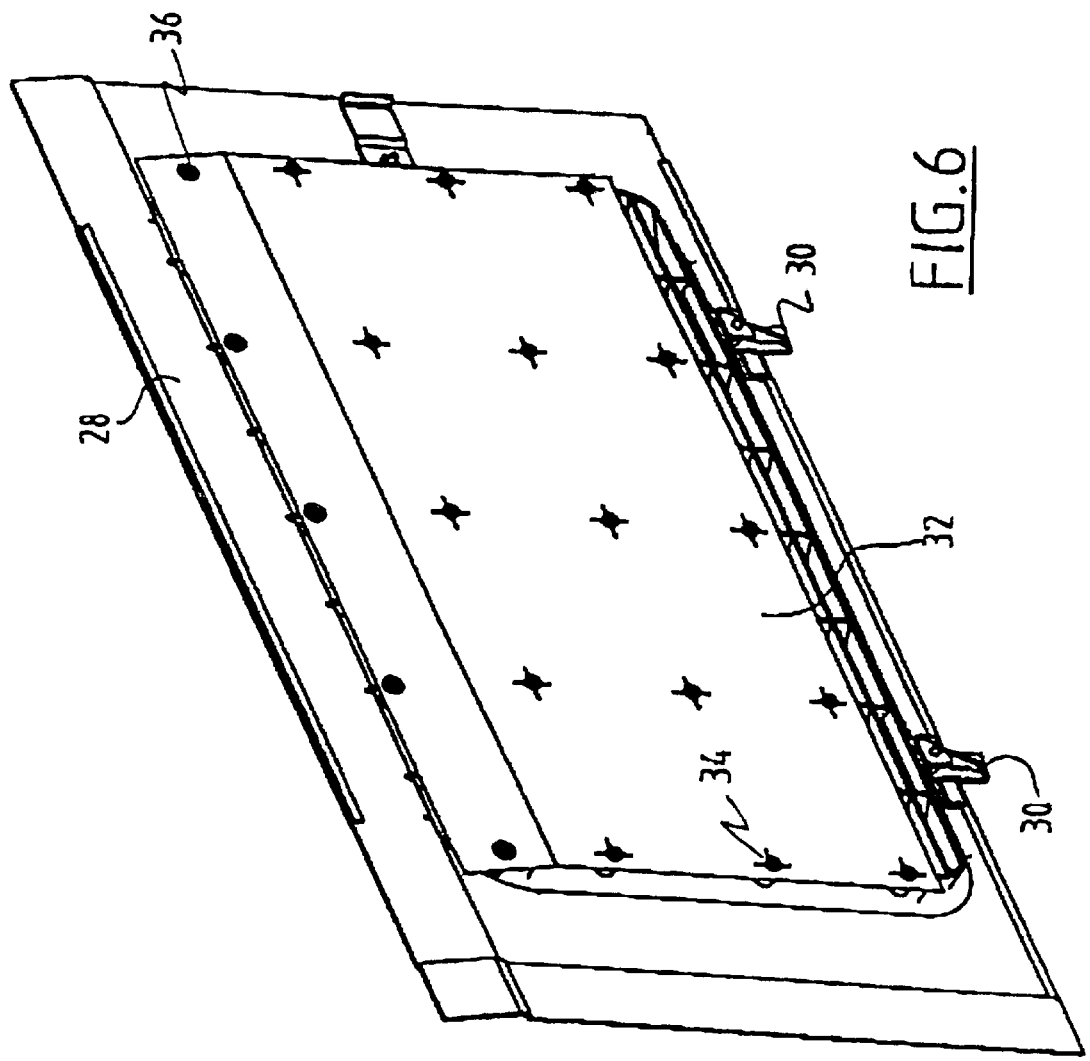
FIG. 6 is an isometric view of a decompression vent in its normal upright position.

FIG. 6 shows a molded grille 28 with retention and release means for 34 and means 35 for permanently attaching the thin baffle 32 to the molded grille 28.

Figure 7:
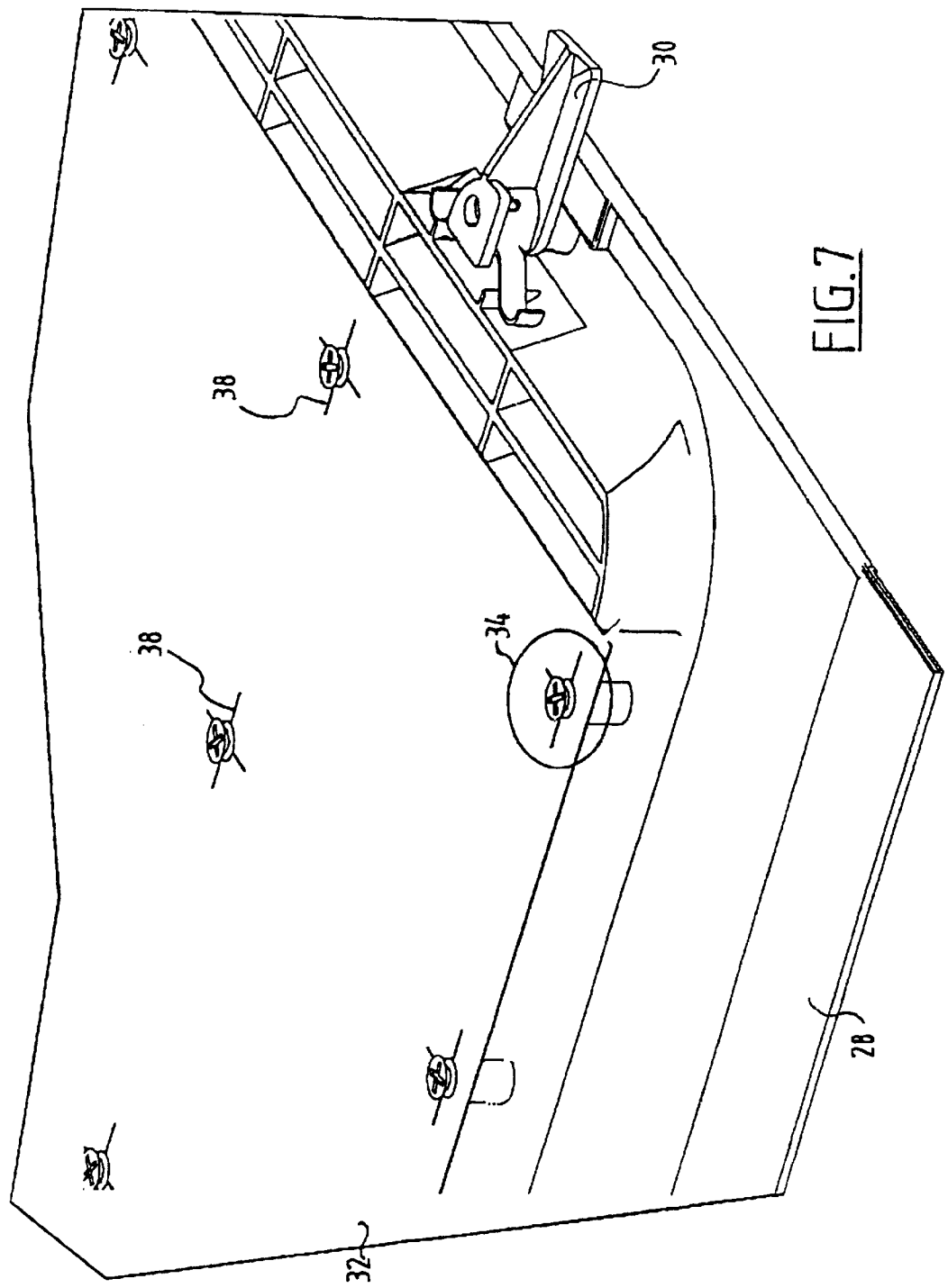
FIG. 7 is a rotated isometric view showing details of the baffle and screw retention.

FIG. 7 shows the baffle 32 held by retention and release means 34 on the back of the grille 28. Retention means 34 such as standard screws engaged into the molded grille 28.

In the event of a sudden loss of pressure in the cargo compartment 24, the resulting pressure differential across the grille 28 forces the small holes with cuts 38 within the thin baffle 32 to be dislodged from the screw heads (retention features) 34 and to be displaced away from the airstream.

The preferred embodiment includes a grille having a rectangular planar baffle which includes slits and holes manufactured using a blanking die. The holes are 0.20 inches in diameter and have four slits that are 0.35 inches in length as measured from the center of the hole. The baffle 32 is a laminate comprised of vinyl films about 0.001 inches thick and layers of aluminum foil 0.003 inches thick and adhesive.

FIGS. 8, 9, and 10 show the retention and release means 34, which, in this embodiment, retains the thin baffle 32 attached to the boss 40 of the molded grille 28 by a screw 42. A cut 44 and a circular hole 33 have been made in the thin baffle 32 to ease the assembly of the parts.

FIGS. 11, 12 and 13 show the same parts as FIGS. 8, 9, and 10 except that FIGS. 11, 12 and 13 do not have cuts extending through its circular hole and a washer is used to secure the fastener to prevent any movement during the service life of the aircraft. It should be apparent that the intent is to allow all but one row at the top of the thin baffle to be disconnected to allow full venting under decompression loads. The fastener installation of FIG. 10 is designed to allow the pressure loading of a rapid decompression to pull out and disconnect the thin baffle from the fasteners of FIG. 10.

This invention is to be construed according to the spirit and scope of the appended claims. For example, the baffle retention means discussed in this application should be considered to cover all manner of retention means included but not limited to screws, mechanical fasteners of all types, velcro, plaster tabs, spring clips, clamps, elastic straps and glue.

What is claimed is:

1. A combination aircraft return air vent/decompression panel assembly comprising a molded grille covering a return air vent in an aircraft and a flexible baffle releaseably attached to the downstream side of the grille and covering a portion thereof, wherein the baffle has a plurality of holes therein and four slits extending outward from each hole;

the grille has a plurality of headed fasteners attached to the downstream side thereof; and the position and size of the holes, slits, and fastener heads are adapted so that the fastener heads protrude through the holes in the baffle during normal flight operations, and the baffle at least partially releases from the grille upon a rapid decompression event.

2. The assembly of claim 1 wherein the headed fastener is a screw.

3. The assembly of claim 1 wherein the baffle is a laminate comprised of a vinyl film and aluminum foil.

4. The assembly of claim 1 wherein the baffle is fixedly attached to the assembly along one of its edges.

5. The assembly of claim 1 which additionally comprises at least one headed fastener near one edge of the baffle adapted to fixedly attach the baffle to the grille at that position.

6. The assembly of claim 1 wherein the baffle has a plurality of horizontal rows of holes adapted to fit over a corresponding number of rows of headed fasteners on the grille and one row of holes and fasteners along an edge of the baffle are adapted to fixedly attach the baffle to the grille along said row.

7. The assembly of claim 6 wherein the baffle is fixedly attached to the grille along said row with washers and screws secured to the grille.

* * * * *